3,235,598
AMINOALKOXY-SUBSTITUTED-
SALICYLALDEHYDES

Robert B. Moffett, Kalamazoo, Mich., assignor to The Upjohn Company, Kalamazoo, Mich., a corporation of Michigan
No Drawing. Original application Mar. 14, 1963, Ser. No. 265,083. Divided and this application Nov. 15, 1963, Ser. No. 323,872
3 Claims. (Cl. 260—570.7)

This application is a division of my application Serial No. 265,083, filed March 14, 1963.

This invention pertains to novel organic chemical compounds, and to a novel process. More particularly, the invention is directed to novel aminolower-alkoxy-3-(pyridyl)coumarins, to a novel process for preparing the same, and to novel aminolower-alkoxysalicylaldehyde intermediates. The novel aminolower-alkoxy-3-(pyridyl) coumarins of this invention can, in their free base form, be represented by the following structural formula

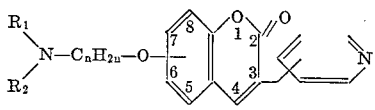
(I)

wherein —$C_nH_{2n}$— is lower-alkylene; $n$ is an integer from 2 to 4, inclusive; and $R_1$ and $R_2$ taken separately are lower-alkyl, and taken together with —N< constitute a saturated heterocyclic amino radical

of from 5 to 7 nuclear atoms, inclusive, wherein Z is a saturated bivalent radical selected from the group consisting of alkylene, oxadialkylene, thiadialkylene, and N-lower-alkylazadialkylene.

The novel free base compounds of Formula I above and Formula II below form acid addition salts with acids, which acid addition salts are contemplated as an embodiment of the invention. Likewise, novel N-oxides of the free base compounds are contemplated as an embodiment of the invention.

The novel coumarin free bases (compounds of Formula I, above), acid addition salts, and N-oxides of this invention are useful chemical compounds. They exhibit pharmacologic activity as central nervous system depressants and are useful to effect sedation in mammals, birds, and other animals when administered orally or parenterally. They are active against fungi, for example, *Trichophyton rubrum* and *Fusarium oxysporum*, and bacteria, for example, *Streptococcus fecalis* and *Streptococcus lactis;* and they can be used for treating fungal and bacterial infections in mammals, birds, and other animals or for inhibiting fungi and bacteria on inanimate objects. The compounds are also useful as ultraviolet screening agents and as optical brightening agents for textiles.

As employed herein, the term "lower-alkylene" means any branched or straight chain alkylene group of from 2 to 4 carbon atoms, inclusive, including for example, ethylene, trimethylene, butylene, dimethylethylene, and the like. The term "lower-alkyl" includes methyl, ethyl, propyl, butyl, and isomeric forms thereof. Similarly, the term, "saturated heterocyclic amino radical

of from 5 to 7 nuclear atoms, inclusive," includes pyrrolidino, 2 - methylpyrrolidino, 2 - ethylpyrrolidino, 2,2-dimethylpyrrolidino, 3,4-dimethylpyrrolidino, 2-isopropylpyrrolidino, 2-sec-butylpyrrolidino, and like alkylpyrrolidino groups, morpholino, 2-ethylmorpholino, 2-ethyl-5-methylmorpholino, 3,3-dimethylmorpholino, thiamorpholino, 3-methylthiamorpholino, 2,3,6-trimethylthiamorpholino, 4-methylpiperazino, 4-butylpiperazino, piperidino, 2-methylpiperidino, 3-methylpiperidino, 4-methylpiperidino, 4-propylpiperidino, 2-propylpiperidino, 4-isopropylpiperidino, and like alkylpiperidino groups, hexamethylenimino, 2 - methylhexamethylenimino, 3,6-dimethylhexamethylenimino, homomorpholino, and the like.

The novel aminolower-alkoxy-3-(pyridyl)coumarins of this invention are conveniently prepared by condensing an amino-lower-alkoxy substituted 2-hydroxybenzaldehyde (i.e., an aminolower-alkoxysalicylaldehyde) of the formula

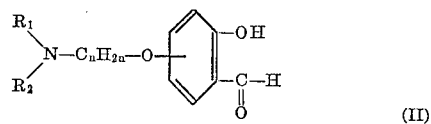
(II)

wherein $R_1$, $R_2$, —$C_nH_{2n}$—, and $n$ are as defined above, with a pyridineacetate of the formula

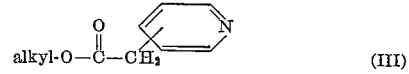
(III)

wherein "alkyl" is a lower-alkyl group, in the presence of a basic catalyst.

Suitable pyridineacetates include lower-alkyl esters, for example, methyl, ethyl, butyl, and like esters. Accordingly, aminolower-alkoxysalicylaldehydes within the scope of Formula II can be condensed with lower-alkyl pyridineacetates, for example, methyl 2-pyridineacetate, ethyl 3-pyridineacetate, and methyl 4-pyridineacetate, to obtain 3-(2-, 3-, and 4-pyridyl)coumarins according to Formula I. Piperidine, morpholine, and the like are suitable basic catalysts for the reaction.

Alternatively, a variation of the Perkin reaction can be used, as described in Organic Reactions vol. I, pp. 210–265, John Wiley and Sons, Inc., New York (1942). According to this procedure, the reaction is effected with the anhydride of a pyridineacetic acid (see Formula III, above, but change "alkyl" to a hydrogen atom) in the presence of a basic catalyst. Illustratively, the anhydride of the pyridineacetic acid is generated in situ by employing 1 to 6 moles of acetic anhydride for each mode of pyridineacetic acid employed in the reaction. Suitable basic catalysts include tertiary amines and salts of alkali metals. Tertiary amines are preferred, for examples, triethylamine, N-methylpiperidine, N-methylmorpholine, and the like. Suitable alkali metal salts include, for example, sodium carbonate, potassium carbonate, sodium acetate, potassium acetate, sodium propionate, and the like.

In accordance with the general reaction of compounds of Formula II with an ester or acid of Formula III in the presence of a basic catalyst, stoichiometric proportions of the reactants are ordinarily employed, but if desired greater or less than stoichiometric proportions of either reactant can be used. When an alkanoic anhydride is employed with a pyridineacetic acid as described, the alkanoic anhydride is advantageously present in excess. The basic catalyst is preferably employed in about a stoichiometrically equivalent amount.

The condensation reaction proceeds over a wide range of temperatures. Any initial exothermic reaction can be followed by heating at temperatures between about 70° C. and about 200° C. in order to ensure completion of the reaction. In general, higher temperatures require less reaction time than lower temperatures.

The aminolower-alkoxy-3-(pyridyl)coumarins produced by the condensation reaction are recovered in accordance with conventional procedures such as concentration of the reaction mixture and precipitation, solvent extraction, and crystallization.

The novel aminolower-alkoxysalicylaldehyde intermediates of this invention are obtained by alkylating a 3-, 4-, 5-, or 6-hydroxysalicylaldehyde with an aminoalkyl chloride or bromide of the formula

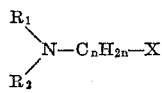

wherein $R_1$, $R_2$, —$C_nH_{2n}$—, and $n$ are as defined above, and X is chlorine or bromine, for example, 3-dimethylaminopropyl chloride, 2-dimethylaminoethyl bromide, and the like. The alkylation is effected by including a strong base such as sodium carbonate, potassium carbonate, sodium methoxide, and the like in the reaction mixture comprising an inert organic solvent. The aminoalkyl halide and the hydroxysalicylaldehyde can be employed in stoichiometric (i.e., equimolar) proportions. Advantageously, however, the aminoalkyl halide is employed in excess, for example, about 1.5 moles of halide for each mole of hydroxysalicylaldehyde up to about 2 moles of halide for each mole of hydroxysalicylaldehyde. Suitable inert organic solvents for the reaction include acetone, methyl ethyl ketone, dioxane, and the like. The desired aminoalkoxysalicylaldehyde product (compounds of Formula II, above) are recovered by conventional procedures such as distillation, solvent extraction, crystallization, and the like.

The novel aminolower-alkoxysalicylaldehyde intermediates of this invention (compounds of Formula II) are active as enzyme inhibitors, for example, they inhibit monoamine oxidase and 5-hydroxytryptophan decarboxylase; and they can be used, in their free base form, as acid addition salts, and as N-oxides as central nervous system stimulants in mammals, birds, and other animals.

Novel acid addition salts of the free base compounds of Formulas I and II above are prepared by neutralizing the free base in an aqueous or non-aqueous medium with a desired acid, illustratively, a pharmacologically acceptable organic or inorganic acid, for example, hydrochloric, hydrobromic, sulfuric, phosphoric, tartaric, citric, acetic, succinic, and like acids. Salts of these and even toxic acids are useful in purifying the free bases.

The free base compounds of Formulas I and II can be reacted with fluosilicic acid to form fluosilicate salts in accordance with U.S. Patents 1,915,334 and 2,075,359. The amine fluosilicate salts thus obtained are effective as mothproofing agents. The free base compounds also form salts with thiocyanic acid, which salts can be condensed with formaldehyde in accordance with U.S. Patents 2,425,320 and 2,606,155 to form amine thiocyanate-formaldehyde condensation products for use as pickling inhibitors.

The novel N-oxides of the free base compounds of Formulas I and II can be prepared by reacting a free base compound of Formula I or II with a peroxidizing agent, for example, hydrogen peroxide, perbenzoic acid, perphthalic acid, peracetic acid, persulfuric acid, and permonosulfuric acid (Caro's acid). The reaction is advantageously carried out in a solvent, illustratively, glacial acetic acid, aqueous acetic acid, ethanol, and aqueous ethanol. The reaction proceeds satisfactorily at about 70° C.; however, higher or lower temperatures can be used. The N-oxides are separated from the reaction mixture and recovered in pure form by conventional procedures such as filtration, solvent evaporation, solvent extraction, and crystallization.

The following examples are illustrative of the process and products of the present invention, but are not to be construed as limiting.

*Example 1. — Preparation of 4-(3-dimethylaminopropoxy)salicylaldehyde and the hydrochloride thereof*

A mixture consisting of 41.5 g. (0.3 mole) of 4-hydroxysalicylaldehyde, 97 g. (0.7 mole) of potassium carbonate, 500 ml. of acetone, and 73 g. (0.6 mole) of 3-dimethylaminopropyl chloride was heated at the reflux temperature, with stirring, for 8 hrs. After setting aside the reaction mixture overnight, the acetone was removed by distillation and the residue thus obtained was dissolved in a mixture of about 1 l. of water and about 500 ml. of ether. The ether:water mixture was then acidified with dilute hydrochloric acid. The aqueous layer was separated, washed twice with ether, basified to about pH 8 with aqueous sodium hydroxide solution, and extracted first with ether and then with methylene chloride. The combined organic extracts were washed with water, and evaporated to dryness. There was thus obtained 24.8 g. of 4-(3-dimethylaminopropoxy)salicylaldehyde as a brown oil. On distillation, some of the compound apparently decomposed, but 1.6 g. of 4-(3-dimethylaminopropoxy)-salicylaldehyde was obtained as a yellow liquid having a boiling point of 112° C. at 0.07 mm. of mercury pressure. The refractive index $n_D^{25}$ was 1.5559. The infrared spectra of this distilled sample and the original oil were almost identical.

The distilled free base was dissolved in absolute ether and acidified with ethanolic hydrogen chloride. The 4-(3-dimethylaminopropoxy)salicylaldehyde hydrochloride separated as a nearly white solid having a melting point of 172° to 174° C. On recrystallization from isopropyl alcohol, 1.7 g. of the compound was obtained as white crystals having a melting point of 173.5° to 175° C.

*Analysis.*—Calcd. for $C_{12}H_{18}ClNO_3$: C, 55.49; H, 6.98; Cl, 13.66; N, 5.39. Found: C, 55.42; H, 6.87; Cl, 13.86; N, 5.26. Following the same procedure but substituting 3-hydroxysalicylaldehyde, 5-hydroxysalicylaldehyde, and 6-hydroxysalicylaldehyde for 4-hydroxysalicylaldehde, there can be prepared 3-(3-dimethylaminopropoxy)salicylaldehyde, 5-(3-dimethylaminopropoxy)salicylaldehyde, and 6-(3-dimethylaminopropoxy)salicylaldehyde, respectively.

Likewise following the same procedure, but substituting 2-(di-n-butylamino)ethyl chloride,
2-dimethylaminoethyl chloride,
4-dimethylaminobutyl chloride,
2-(1-pyrrolidyl)ethyl chloride,
2-[1-(2,2-dimethylpyrrolidyl)]ethyl chloride,
3-[1-(4-methylpiperazyl)]propyl chloride,
2-(1-piperidyl)ethyl chloride,
2-[1-(4-propylpiperidyl)]ethyl chloride,
2-(1-hexamethylenimino)ethyl chloride,
2-[1-(2-methylhexamethylenimino)]ethyl chloride,
2-(4-morpholyl)ethyl chloride,
2-[4-(2-methylmorpholyl)]ethyl chloride, and
2-(4-thiamorpholyl)ethyl chloride for 3-dimethylaminopropyl chloride, there can be prepared
4-[2-(di-n-butylamino)ethoxy]-,
4-(2-dimethylaminoethoxy)-,
4-(4-dimethylaminobutoxy)-,
4-[2-(1-pyrrolidyl)ethoxy]-,
4-{2-[1-(2,2-dimethylpyrrolidyl)]ethoxy}-,
4-{3-[1-(4-methylpiperazyl)]propoxy}-,
4-[2-(1-piperidyl)ethoxyl]-,
4-{2-[1-(4-propylpiperidyl)]ethoxy}-,
4-[2-(1-hexamethylenimino)ethoxy]-,
4-{2-[1-(2-methylhexamethyleneimino]ethoxy}-,
4-[2-(4-morpholy)ethoxy]-,
4-{2-[4-(2-methylmorpholyl)]ethoxy}-, and
4-[2-(4-thiamorpholyl)ethoxy]salicylaldehydes, respectively.

*Example 2.—Preparation of 7-(3-dimethylaminopropoxy)-3-(4-pyridyl)coumarin and the dihydrochloride thereof*

A solution consisting of 24.8 g. (0.111 mole) of undistilled 4 - (3 - dimethylaminopropoxy)salicylaldehyde (prepared as above), 16.8 g. (0.111 mole) of methyl 4-pyridineacetate, and 6 ml. of piperidine in 125 ml. of absolute ethanol was heated at the reflux temperature, with stirring, for 1 hr. After setting aside the reaction mixture for 3 days, and then scratching the walls of the reaction vessel, crystallization was initiated. The crystallizing mixture was cooled, and the crystals were collected on a filter and washed with ethanol. There was thus obtained 12.1 g. of 7-(3-dimethylaminopropoxy)-3-(4-pyridyl)coumarin as a light yellow solid having a melting point of 135° to 137.5° C. Recrystallization from 60 ml. of ethanol gave 11.4 g. of yellow crystals having a melting point of 136° to 138° C.

*Analysis.*—Calcd. for $C_{19}H_{20}N_2O_3$: C, 70.35; H, 6.22; N, 8.64. Found: C, 70.29; H, 6.29; N, 8.50.

7-(3-dimethylaminopropoxy)-3-4-pyridyl)coumarin dihydrochloride can be prepared by dissolving the free base in ether, adding an ethereal solution of hydrogen chloride, and evaporating the mixture to dryness.

Following the above procedure, but substituting methyl 2-pyridineacetate for methyl 4-pyridineacetate, there can be prepared 7-(3-dimethylaminopropoxy)-3-(2-pyridyl) coumarin and its dihydrochloride. Similarly, starting with ethyl 3-pyridineacetate, there can be prepared 7-(3-dimethylaminopropoxy)-3-(3-pyridyl)coumarin and its dihydrochloride.

*Example 3*

Following the procedure of Example 2 but substituting 3-(3-dimethylaminopropoxy)-,
5-(3-dimethylaminopropoxy)-,
6-(3-dimethylaminopropoxy)-,
4-[2-(di-n-butylamino)ethoxy]-,
4-(2-dimethylaminoethoxy)-,
4-(4-dimethylaminobutoxy)-,
4-[2-(1-pyrrolidyl)ethoxy]-,
4-{2-[1-(2,2-dimethylpyrrolidyl)]ethoxy}-,
4-{3-[1-(4-methylpiperazyl)]propoxy}-,
4-[2-(1-piperidyl)ethoxy]-,
4-{2-[1-(4-propylpiperidyl)]ethoxy}-,
4-[2-(1-hexamethylenimino)ethoxy]-,
4-{2-[1-(2-methylhexamethylenimino)]ethoxy}-,
4-[2-(4-morpholyl)ethoxy]-,
4-{2-[4-(2-methylmorpholyl)]ethoxy}-, and
4-[2-(4-thiamorpholyl)ethoxy]salicylaldehydes for 4-(3-dimethylaminopropoxy)salicylaldehyde, there can be prepared 8-(3-dimethylaminopropoxy)-,
6-(3-dimethylaminopropoxy)-,
5-(3-dimethylaminopropoxy)-,
7-[2-(di-n-butylamino)ethoxy]-,
7-(2-dimethylaminoethoxy)-,
7-(4-dimethylaminobutoxy)-,
7-[2-(1-pyrrolidyl)ethoxy]-,
7-{2-[1-(2,2-dimethylpyrrolidyl)]ethoxy}-,
7-{3-[1-(4-methylpiperazyl)]propoxy}-,
7-[2-(1-piperidyl)ethoxy]-,
7-{2-[1-(4-propylpiperidyl)]ethoxy}-,
7-[2-(1-hexamethylenimino)ethoxy]-,
7-{2-[1-(2-methylhexamethylenimino)]ethoxy}-,
7-[2-(4-morpholyl)ethoxy]-,
7-{2-[4-(2-methylmorpholyl)]ethoxy}-, and
7-[2-(4-thiamorpholyl)ethoxy]-3-(4-pyridyl)coumarins, respectively.

*Example 4.—Preparation of 7-(3-dimethylaminopropoxy)-3-(4-pyridyl)coumarin N-oxide*

7 - (3-dimethylaminopropoxy)-3-(4--pyridyl)coumarin N-oxide can be prepared as follows: A solution of 7-(3-dimethylaminopropoxy) - 3-(4-pyridyl)coumarin (Example 2, above) and 30% hydrogen peroxide in 100 ml. of glacial acetic acid is heated in a bath at 70° C. for about 16 hrs. The 7-(3-dimethylaminopropoxy)-3-(4-pyridyl) coumarin N-oxide can be recovered by distillation of the solvent under reduced pressure.

Following the same procedure, but substituting 4-(3-dimethylaminopropoxy)salicylaldehyde for 7-(3-dimethylaminopropoxy-3-(4-pyridyl)coumarin, there can be prepared 4 - (3 - dimethylaminopropoxy)salicylaldehyde N-oxide.

I claim:
1. A compound selected from the group consisting of (1) free base compounds of the formula

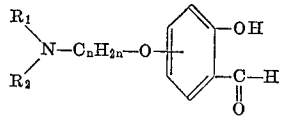

wherein $-C_nH_{2n}-$ is lower-alkylene; $n$ is an integer from 2 to 4, inclusive; and $R_1$ and $R_2$ taken separately are lower-alkyl, and taken together with $-N<$ constitute a saturated heterocyclic amino radical

of from 5 to 7 nuclear atoms, inclusive, wherein Z is a saturated bivalent radical selected from the group consisting of alkylene, oxadialkylene, thiadialkylene, and N-lower-alkylazadialkylene; (2) acid addition salts thereof; and (3) N-oxides thereof.

2. 4-(3-dimethylaminopropoxy)salicylaldehyde.
3. 4-(3-dimethylaminopropoxy)salicylaldehyde hydrochloride.

References Cited by the Examiner

UNITED STATES PATENTS

| | | | |
|---|---|---|---|
| 1,894,865 | 1/1933 | Hartmann et al. | 260—570.7 |
| 2,774,766 | 12/1956 | Goldberg et al. | 260—570.7 XR |
| 2,796,435 | 6/1957 | Goldberg et al. | 260—570.7 |
| 2,879,293 | 3/1959 | Goldberg et al. | 260—570.9 XR |

FOREIGN PATENTS

| | | |
|---|---|---|
| 91,322 | 7/1961 | Denmark. |
| 91,323 | 7/1961 | Denmark. |
| 377,464 | 7/1932 | Great Britain. |

OTHER REFERENCES

Burger, "Medicinal Chemistry," 2nd ed., page 75 (1960).

Cole, "Therapeutic Efficacy of Antidepressant Drugs," Jour. American Medical Association, November 2, 1964, pages 448–455.

Goldberg, "Monamine Oxidase Inhibitors," as above, pages 456–462.

CHARLES B. PARKER, *Primary Examiner.*

ROBERT V. HINES, *Assistant Examiner.*